(12) United States Patent
Kim et al.

(10) Patent No.: US 9,013,619 B2
(45) Date of Patent: Apr. 21, 2015

(54) CAMERA WITH MULTI-FUNCTION DISPLAY

(75) Inventors: Dae-myung Kim, Hwaseong-si (KR); Dong-jun Kum, Yongin-si (KR); Yun-je Oh, Seongnam-si (KR); Lae-kyoung Kim, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 13/597,568

(22) Filed: Aug. 29, 2012

(65) Prior Publication Data
US 2013/0148002 A1    Jun. 13, 2013

(30) Foreign Application Priority Data

Dec. 13, 2011    (KR) .................. 10-2011-0133996

(51) Int. Cl.
*H04N 5/222* (2006.01)
*H04N 5/225* (2006.01)
*H04N 5/232* (2006.01)

(52) U.S. Cl.
CPC .......... *H04N 5/2251* (2013.01); *H04N 5/23293* (2013.01)

(58) Field of Classification Search
CPC . H04N 5/2251; H04N 5/2252; H04N 5/2253; H04N 5/2254; H04N 5/23293
USPC ........... 348/333.01, 333.06, 333.11, 373–376
See application file for complete search history.

(56) References Cited

U.S. PATENT DOCUMENTS

| | | | | |
|---|---|---|---|---|
| 6,466,202 B1* | 10/2002 | Suso et al. | ..................... | 345/169 |
| 6,861,788 B2 | 3/2005 | Li et al. | | |
| 7,626,630 B2* | 12/2009 | Nishino et al. | ........... | 348/333.06 |
| 2003/0041871 A1* | 3/2003 | Endo et al. | ..................... | 132/301 |
| 2003/0134668 A1* | 7/2003 | Mekuria | ....................... | 455/572 |
| 2004/0141064 A1* | 7/2004 | Ezawa | ..................... | 348/207.99 |
| 2006/0125946 A1* | 6/2006 | Nishino et al. | ........... | 348/333.06 |
| 2007/0040033 A1* | 2/2007 | Rosenberg | ............... | 235/462.36 |
| 2007/0057866 A1* | 3/2007 | Lee et al. | ........................ | 345/1.1 |
| 2007/0182663 A1* | 8/2007 | Biech | ............................. | 345/1.1 |
| 2009/0278974 A1* | 11/2009 | Kuwahara et al. | ........ | 348/333.06 |
| 2010/0026854 A1* | 2/2010 | Rodriguez et al. | ........ | 348/240.99 |
| 2011/0117959 A1* | 5/2011 | Rolston | ....................... | 455/556.1 |

FOREIGN PATENT DOCUMENTS

KR     1020050014561 A     2/2005

\* cited by examiner

*Primary Examiner* — Timothy J Henn
(74) *Attorney, Agent, or Firm* — Drinker Biddle & Reath LLP

(57) ABSTRACT

A camera is provided that includes a first panel including a plurality of lens units to capture an image, the lens units being disposed at one side of the first panel; a second panel that is rotatably connected to one edge of the first panel so that the first panel and the second panel rotate relative to each other between a first position contacting the one side of the first panel and a second position contacting the other side of the second panel; and an electronic mirror display unit to display an image if a signal is applied to the electronic mirror display unit and to reflect light if a signal is not applied to the electronic mirror display unit, the electronic mirror display unit being disposed at one side of the second panel corresponding to the one side of the first panel at the first position.

21 Claims, 15 Drawing Sheets

ID: 9,013,619 B2

CAMERA WITH MULTI-FUNCTION DISPLAY

CROSS-REFERENCE TO RELATED PATENT APPLICATION

This application claims the priority benefit of Korean Patent Application No. 10-2011-0133996, filed on Dec. 13, 2011, in the Korean Intellectual Property Office, which is incorporated herein in its entirety by reference.

BACKGROUND

1. Field of the Invention

The invention relates to a camera, and more particularly, to a camera with a multi-function display that may perform various functions, such as a mirror function, a display function, and the like.

2. Description of the Related Art

Cameras that may capture still images or moving images include a display that may display an image of a subject to be captured or a captured image.

Korean Patent Application Publication No. 2005-0014561 discloses a camera with a rotating display. Thus, a user may observe the display from several angles. However, accommodation grooves need to be formed in a main body of the camera so as to install the display to be rotatable. Accordingly, the arrangement of components and a design of this camera are limited.

SUMMARY

The invention provides a camera with a display that may perform various functions.

The invention also provides a camera that includes a display that may be adjusted in an angular range of about 360 degrees and may perform various functions according to angular adjustment.

According to an aspect of the invention, there is provided a camera including: a first panel including a plurality of lens units for image capturing, the lens units being disposed on one side of the first panel; a second panel that is rotatably connected to one edge of the first panel so that the first panel and the second panel rotate relative to each other between a first position contacting the one side of the first panel and a second position contacting the other side of the second panel; and an electronic mirror display unit for displaying an image if a signal is applied to the electronic mirror display unit, and for reflecting light if a signal is not applied to the electronic mirror display unit, the electronic mirror display unit being disposed at one side of the second panel corresponding to the one side of the first panel at the first position.

The camera may further include a solar light generation unit for generating electricity by receiving solar light, the solar light generation unit being disposed at the other side of the second panel corresponding to the other side of the first panel at the second position.

The camera may further include a solar light generation unit for generating electricity by receiving solar light, solar light generation unit being disposed at the other side of the first panel.

The electronic mirror display unit may display an image on one region of the electronic mirror display unit and may reflect light in another region of the electronic mirror display unit.

The camera may further include an image capturing unit for converting an image formed by each lens unit into an electrical signal, wherein an image captured by the image capturing unit is displayed on at least one region of the electronic mirror display unit.

The electronic mirror display unit may illuminate a subject by emitting illumination light onto another region of the electronic mirror display unit.

The camera may further include a communication unit for performing communication with an outside device, wherein the electronic mirror display unit displays an image transmitted through the communication unit from the outside device.

The camera may further include a voice input unit for receiving a user's voice signal and a speaker for outputting sound.

The electronic mirror display unit may illuminate a subject by emitting illumination light onto at least one region of the electronic mirror display unit.

The electronic mirror display unit may change a color of the illumination light so as to change a color of the subject.

The electronic mirror display unit may display guide marks for changing a color of the illumination light in another region of the electronic mirror display unit.

The camera may further include a touch panel for detecting a user's touch, the touch panel being disposed on the electronic mirror display unit.

A rotation angle between the first panel and the second panel may be maintained after being adjusted in a range from the first position to the second position.

The camera may further include a shutter button for generating a signal due to user's input manipulation so as to start an image capturing operation of the image capturing unit, the shutter button being disposed at a side edge of the first panel.

The camera may further include a shutter button for generating a signal due to user's input manipulation so as to start an image capturing operation of the image capturing unit, the shutter button being disposed at a side edge of the second panel.

The camera may further include a shutter button for generating a signal due to user's input manipulation so as to start an image capturing operation of the image capturing unit, the shutter button being disposed at the one side of the first panel.

BRIEF DESCRIPTION OF THE DRAWINGS

The above and other features and advantages of the invention will become more apparent in review of detail exemplary embodiments thereof with reference to the attached drawings, in which.

DETAILED DESCRIPTION

The invention will now be described more fully with reference to the accompanying drawings, in which exemplary embodiments of the invention are shown.

Figure 1:
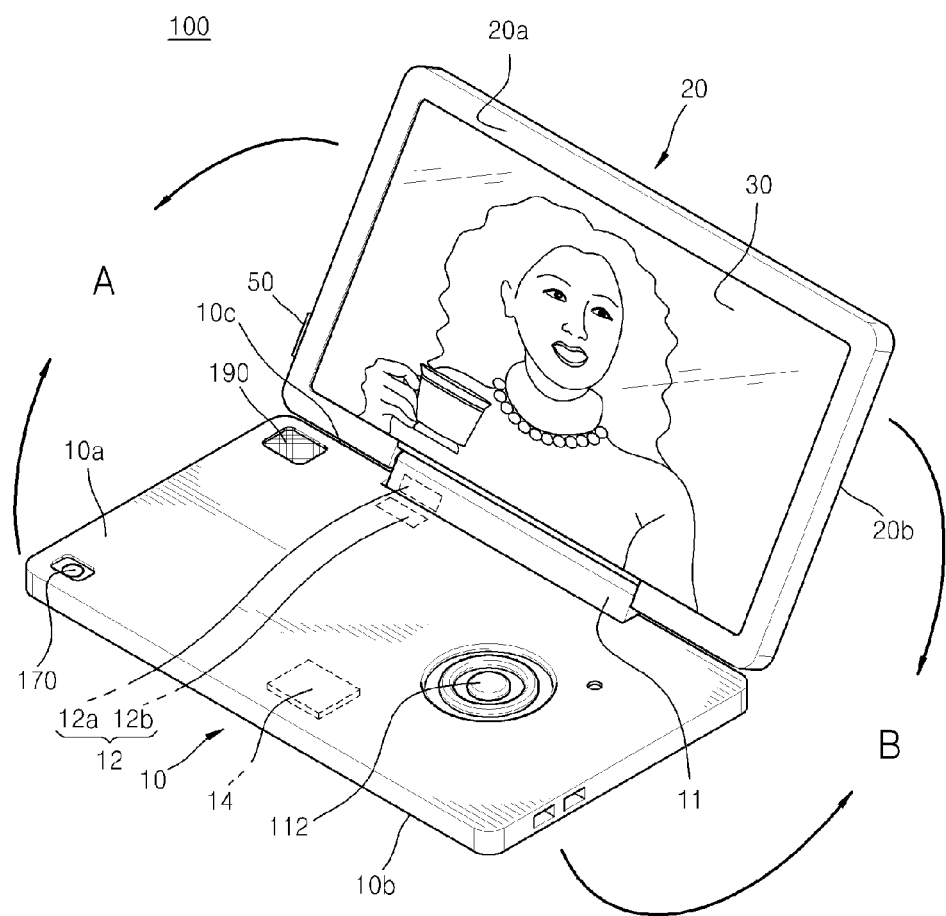
FIG. 1 is a perspective view of a camera with a multi-function display, according to an embodiment of the invention.

FIG. 1 is an isometric view of a camera 100 with a multi-function display, according to an embodiment of the invention.

Referring to FIG. 1, the camera 100 with a multi-function display according to the present embodiment includes a first panel 10, a second panel 20 that is rotatably connected to the first panel 10, and an electronic mirror display unit 30 that is disposed on the second panel 20.

The second panel 20 is rotatably connected to the first panel 10 by interposing a hinge portion 11, which is connected to one edge 10c of the first panel 10, between the first panel 10 and the second panel 20. One end of the hinge portion 11 is rotatably connected to the first panel 10, and the other end of the hinge portion 11 is rotatably connected to the second panel 20. The first panel 10 and the second panel 20 may be rotated so that an angle formed by the first panel 10 and the second panel 20 may be adjusted in the range of about 360 degrees.

One side 10a of the first panel 10 and one side 20a of the second panel 20 correspond to each other. A plurality of lens units 112 for image capturing is disposed at the side 10a of the first panel 10. The electronic mirror display unit 30 is disposed at the side 20a of the second panel 20.

The first panel 10 and the second panel 20 may be connected to exchange signals with each other. For example, the first panel 10 and the second panel 20 may be electrically connected to each other by disposing a flexible circuit board (not shown) on a rotation shaft (not shown) inside the hinge portion 11, or by disposing an electric conductivity terminal portion on each of a portion for connecting the hinge portion 11 and the first panel 10 and a portion for connecting the hinge portion 11 and the second panel 20. The first panel 10 and the second panel 20 may also be electrically connected to each other using a wireless communication connection method such as Bluetooth, or the like, as well as an electrical connection method.

In FIG. 1, the first panel 10 and the second panel 20 may be rotated in a direction arrow A or arrow B. When the first panel 10 and the second panel 20 are rotated in the direction arrow A, the side 10a of the first panel 10 and the side 20a of the second panel 20 may come in contact with each other. In addition, when the first panel 10 and the second panel 20 are rotated in the direction arrow B, the other side 10b of the first panel 10 and the other side 20b of the second panel 20 may come in contact with each other.

A voice input unit 170 that generates a signal in response to user's voice and, a speaker 190 that generates sound are disposed at the side 10a of the first panel 10. A gyro sensor 14 that detects a change of angular orientation of the camera 100 when the camera 100 rotates is disposed inside the first panel 10.

In addition, a rotation detecting unit 12 is disposed between the first panel 10 and the hinge portion 11. The rotation detecting unit 12 includes a magnet 12b disposed on the first panel 10, and a magnetic detecting sensor 12a that is disposed on the hinge portion 11 and detects a change of a magnetic force. As a rotation angle formed by the first panel 10 with the second panel 20 varies, the strength of a magnetic force of the magnet 12b that acts on the magnetic detecting sensor 12a also varies. Thus, the rotation angle between the first panel 10 and the second panel 20 may be detected using an output signal of the magnetic detecting sensor 12a of the rotation detecting unit 12.

A shutter button 50 generates a signal due in response to a user's manipulation. A user may perform image capturing by manipulating the shutter button 50.

Figure 2:
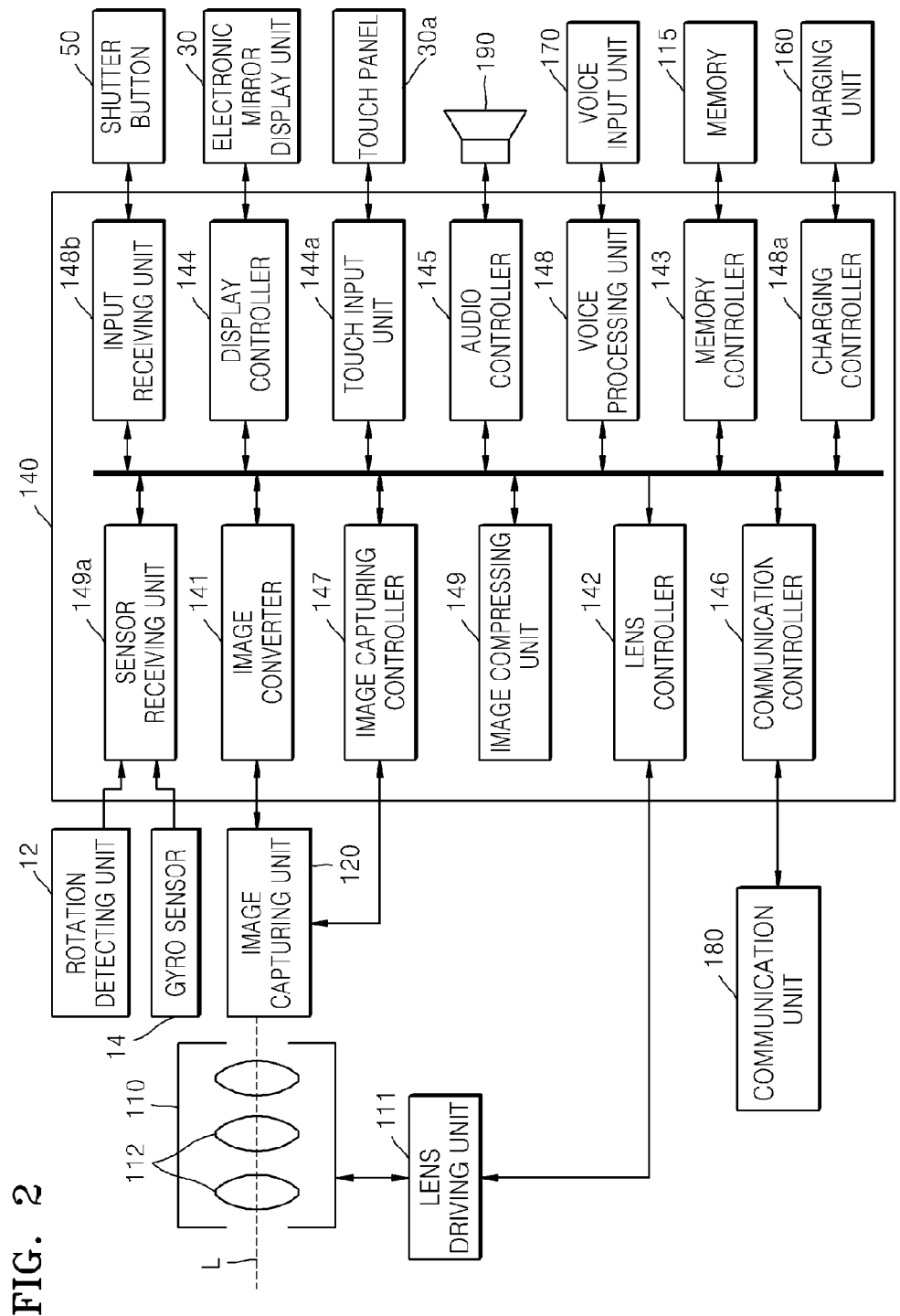
FIG. 2 is a schematic block diagram illustrating the connection relationships between elements of the camera illustrated in FIG. 1.

FIG. 2 is a schematic block diagram illustrating the connection relationships between elements of the camera 100 illustrated in FIG. 1.

A controlling unit 140 may be implemented in the first panel 10 or the second panel 20. The controlling unit 140 is electrically connected to an image capturing unit 120, a lens driving unit 111, the electronic mirror display unit 30, a touch panel 30a, the shutter button 50, the voice input unit 170, a memory 115, the speaker 190, a charging unit 160, a communication unit 180, the rotation detecting unit 12, the gyro sensor 14, or the like, and exchanges control signals with the elements so as to control operations of each element, or performs a data processing function, or the like.

The controlling unit 140 includes an image converter 141, a lens controller 142, a memory controller 143, a display controller 144, a touch input unit 144a, an audio controller 145, a communication controller 146, an image capturing controller 147, a voice processing unit 148, a charging controller 148a, an input receiving unit 148b, an image compressing unit 149, and a sensor receiving unit 149a.

The controlling unit 140 may be implemented as a micro-chip, or a circuit board including a micro-chip. The elements of the controlling unit 140 may be implemented by software or circuits embedded in the controlling unit 140.

The image capturing unit 120 is disposed in the first panel 10 of the camera 100 and captures an image of a subject to convert the captured image into an electrical signal. The electrical signal generated by the image capturing unit 120 is converted into image data by the image converter 141. The image capturing controller 147 of the controlling unit 140 controls the image capturing unit 120 to perform an image capturing operation.

A lens barrel 110 that is disposed in front of the image capturing unit 120 to configure an optical system includes a plurality of lens units 112 performing a function of forming an image of external image light on an image capturing plane of the image capturing unit 120.

The plurality of lens units 112 are disposed in such a way that distances therebetween may vary. When the distances between the lens units 112 vary, a zooming rate, focus, or the like may be adjusted. The lens units 112 are disposed on an optical axis L. The optical axis L refers to a virtual straight line connecting optical centers of the lens units 112 and the image capturing unit 120.

The lens units 112 are driven by the lens driving unit 111 having a driving unit such as a zoom motor (not shown), so that their positions may vary. The lens units 112 may include a zoom lens that enlarges or reduces the size of the subject, and a focus lens that adjusts a focus of the subject.

The lens driving unit 111 operates in response to a control signal applied by the lens controller 142 of the controlling unit 140 and controls positions of the lens units 112 so that the lens units 112 have one from among a plurality of enlargement magnifications.

The image capturing unit 120 includes a photoelectric conversion device, such as a charge-coupled device (CCD) or a complementary metal oxide semiconductor (CMOS), and converts image light incident through the lens units 112 into an electrical signal. The image capturing unit 120 is driven in response to a control signal applied by the image capturing controller 147.

The image converter 141 converts the electrical signal formed by the image capturing unit 120 into image data, thereby performing image processing or storing the image data in a storage medium, such as the memory 115. For example, after converting the electrical signal of the image capturing unit 120 into red, green, and blue (RGB) data, the image converter 141 may convert the RGB data into raw data having the same shape as that of a YUV signal including a brightness Y signal and a chrominance UV signal.

In addition, an operation of converting the electrical signal of the image capturing unit 120 using the image converter 141 may include detailed operations; reducing driving noise of the image capturing unit 120 included in the electrical signal using a correlation double sampling (CDS) circuit; controlling a gain of the electrical signal after noise reduction using an automatic gain control (AGC) circuit; converting an analog signal into a digital signal using an analog-to-digital (A/D) converter; and performing signal processing, such as pixel defect correction, gain correction, white balance correction, gamma correction, or the like, of the digital signal. The CDS circuit, the AGC circuit, or the A/D converter described above may be implemented as additional circuits.

The memory controller 143 controls the memory 115 to record data on the memory 115 or to read recorded data or setting information from the memory 115.

The memory 115 may include volatile embedded memory, for example, a semiconductor memory device such as a synchronous dynamic random access memory (DRAM) (SDRAM), or the like. The memory 115 may perform a buffer memory function of storing image data generated by the image converter 141 temporarily and a work memory function used in a data processing work.

In addition, the memory 115 may include non-volatile external memory, for example, a memory stick, a flash memory such as a secure digital/multimedia card (SD/MMC), a storage device such as a hard disk drive (HDD), or an optical storage device such as digital versatile disc (DVD) or a compact disc (CD). In this case, image data that is compressed by the image compressing unit 149 in a format such as a JPEG file, a TIF file, a GIF file, a PCX file, or the like may be stored in the memory 115.

The sensor receiving unit 149a receives sensor signals input from the rotation detecting unit 12 and the gyro sensor 14. The controlling unit 140 may select from among several functions and perform the selected function(s) automatically according to a change of the rotation angle between the first panel 10 and the second panel 20 based on the sensor signal of the rotation detecting unit 12, or according to a position of the camera 100 based on the sensor signal of the gyro sensor 14.

The electronic mirror display unit 30 disposed on the second panel 20 of FIG. 1 may selectively perform at least one of a display function of displaying an image as a signal is applied to the electronic mirror display unit 30 from the controlling unit 140, and a mirror function of reflecting light in case that there is no signal applied to the electronic mirror display unit 30.

The electronic mirror display unit 30 may be implemented by attaching a half-mirror onto the surface of a display device, such as a liquid crystal display (LCD) device or an organic light-emitting display device. The half-mirror refers to a mirror that reflects light incident on one side of the half-mirror and allows light incident on the other side of the half-mirror to transmit therethrough.

Since the present embodiment is not limited to the configuration of the electronic mirror display unit 30, the electronic mirror display unit 30 may be manufactured using various methods. For example, the electronic mirror display unit 30 may be manufactured by forming a reflective layer for performing a half-mirror function on part of an electrode layer of the LCD device or the organic light-emitting display device, or by coating a light-reflecting material on part of an electrode that constitutes a pixel. In addition, the electronic mirror display unit 30 may be implemented by disposing a plurality of micro-mirrors, which are switched between a position at which light is reflected and a position at which light transmits, on the LCD device or the organic light-emitting display device using a micro-electromechanical systems (MEMS) technology using a mechanical factor with a micro-scale.

The touch panel 30a may be disposed on the surface of the electronic mirror display unit 30. The touch panel 30a detects a touch on its surface and generates a signal corresponding to the detected touch position.

The shutter button 50 generates a signal due to a user's manipulation. A user may perform image capturing by manipulating the shutter button 50. The controlling unit 140 may receive the signal of the shutter button 50 from the input receiving unit 148b to control the image capturing controller 148 or the lens controller 142. Referring to FIG. 1, the shutter button 50 is disposed at an edge of the second panel 20.

Figure 3:
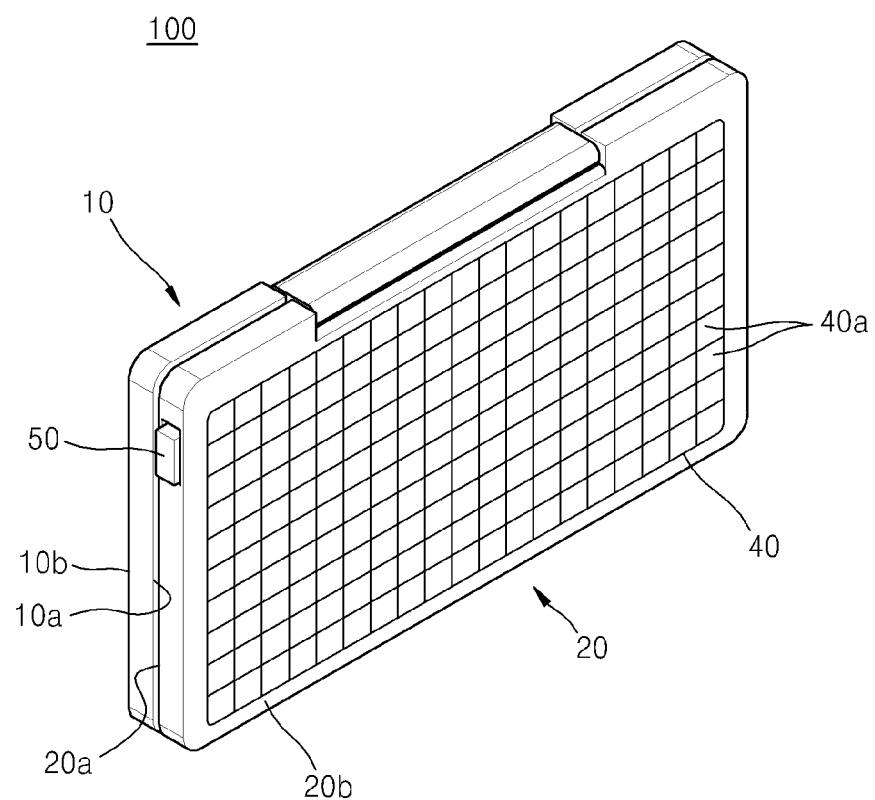
FIG. 3 is an isometric view of an operating state of the camera illustrated in FIG. 1.
Figure 4:
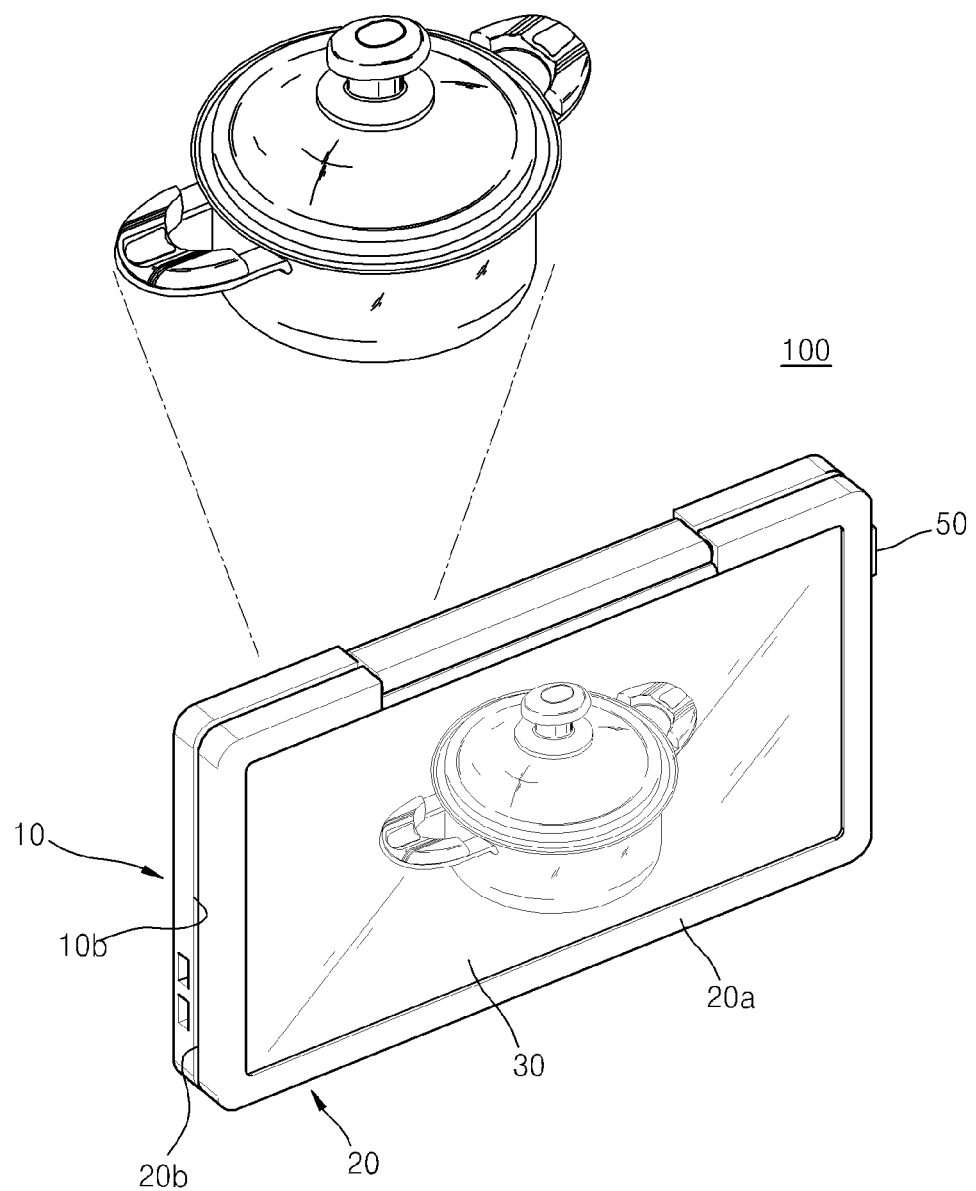
FIG. 4 is an isometric view of another operating state of the camera illustrated in FIG. 1.

FIG. 3 is an isometric view showing an operating state of the camera 100 illustrated in FIG. 1, and FIG. 4 is an isometric view of another operating state of the camera 100 illustrated in FIG. 1.

Referring to FIG. 3, the second panel 20 is in a first position. When the second panel 20 is in the first position, the side 10a of the first panel 10 and the side 20a of the second panel 20 contact each other.

Referring to FIG. 4, the second panel 20 is changed to a second position. When the second panel is in the second position, the other side 10b of the first panel 10 and the other side 20b of the second panel 20 contact each other.

In this way, the second panel 20 and the first panel 10 may be rotated relative to each other so that the second panel 20 may be switched between the first position and the second position.

As shown in FIG. 3, a solar light generation unit 40 may be disposed at the other side 20b of the second panel 20. The solar light generation unit 40 includes a plurality of solar light cells 40a that generates electricity by receiving solar light. The electricity generated by the solar light generation unit 40 is transferred to the charging unit 160 of FIG. 2, so that a battery (not shown) of the camera 100 may be charged. Thus, when the second panel 20 is at the first position, as illustrated in FIG. 3, the solar light generation unit 40 may be exposed to solar light, and using an additional electricity charging device, a function of charging the camera 100 may be automatically performed.

Since the present embodiment is not limited by the position of the solar light generation unit 40 described above. For example, the solar light generation unit 40 may be disposed at the other side 10*b* of the first panel 10.

When the second panel 20 is at the second position, as illustrated in FIG. 4, the side 10*a* of the first panel 10 faces the subject so that an image capturing operation may be performed. In this way, when the second panel 20 is at the second position, it may be set in advance using a menu of the camera 100 to automatically convert a mode of the camera 100 into an image capturing mode in which the image capturing operation may be performed by the camera 100.

The image capturing unit 120 of FIG. 1 may convert image light of the subject transferred through the lens units 112 to generate in real-time a live view image that indicates a shape of the subject. Since the live view image is displayed on the electronic mirror display unit 30, the user may adjust a composition by checking an image of the subject in real-time or manipulate the shutter button 50 after adjusting other image capturing conditions, thereby performing the image capturing operation.

Figure 5:
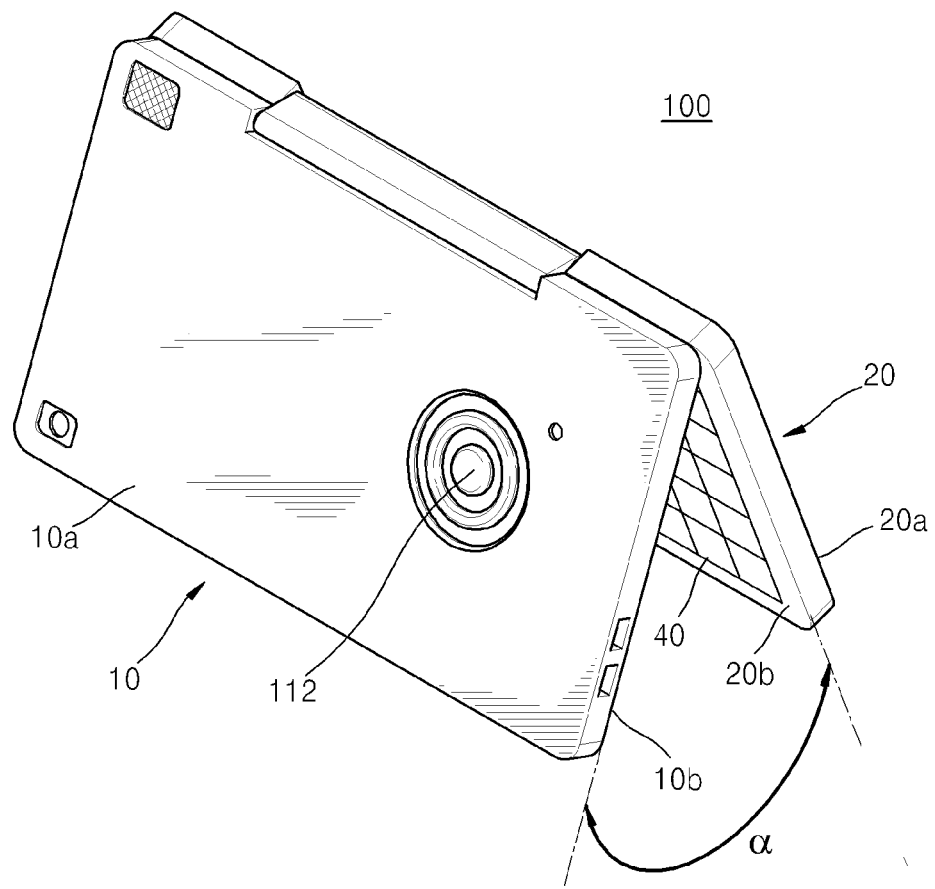
FIG. 5 is an isometric view of another operating state of the camera illustrated in FIG. 1.

FIG. 5 is an isometric view of another operating state of the camera 100 illustrated in FIG. 1.

When the second panel 20 illustrated in FIG. 4 is in the second position, the second panel 20 may be rotated relative to the first panel 10 so that an angle α between the first panel 10 and the second panel 20 may be adjusted in the range of an acute angle, as illustrated in FIG. 5. In this state, when the camera 100 is put on the bottom, as illustrated in FIG. 5, the camera 100 may stand so that automatic image capturing may be performed in the state where the camera 100 is fixed.

In addition, when the user holds the camera 100 in his/her hand without putting the camera 100 on the bottom, the angle α between the first panel 10 and the second panel 20 may be adjusted in the range of an acute angle, as illustrated in FIG. 5. For example, in case that image capturing is performed by lifting up the camera 100 at an upper position or by putting down the camera 100 at a lower position, the angle α of the second panel 20 relative to the first panel 10 may be adjusted to check the subject easily.

When the angle α between the first panel 10 and the second panel 20 is in the range of an acute angle, as illustrated in FIG. 5, it may be set in advance using the menu of the camera 100 to automatically convert the mode of the camera 100 into the image capturing mode in which the image capturing operation may be performed by the camera.

Figure 6:
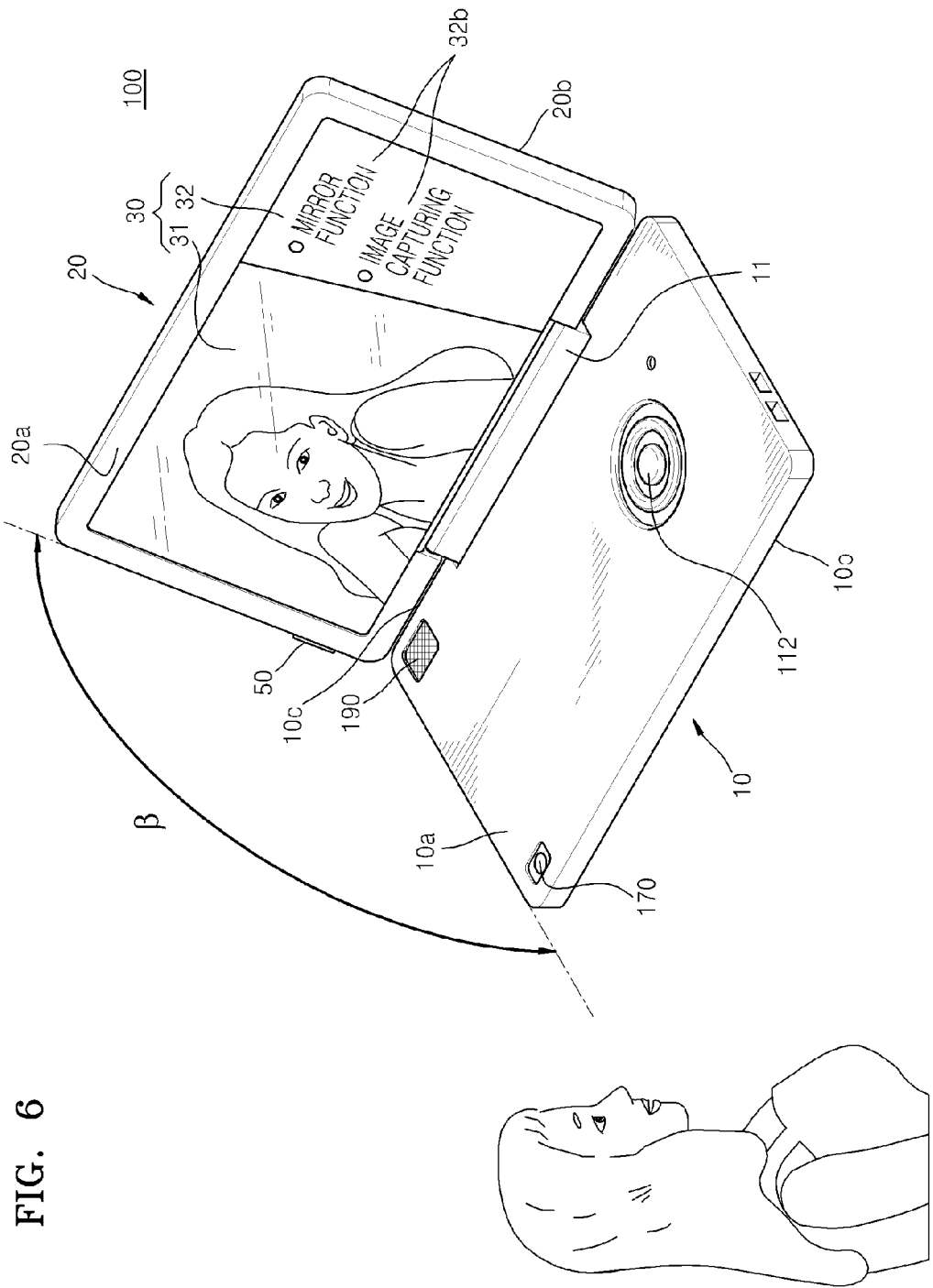
FIG. 6 is an isometric view of another operating state of the camera illustrated in FIG. 1.

FIG. 6 is an isometric view of another operating state of the camera 100 illustrated in FIG. 1.

When an angle β between the first panel 10 and the second panel 20 is adjusted in the range of an obtuse angle, as illustrated in FIG. 6, a mirror function in which a first region 31 of the electronic mirror display unit 30 is converted into a mirror, may be performed. The mirror function may be performed by blocking an electrical signal applied to pixels included in the first region 31 of the electronic mirror display unit 30.

When the mirror function is performed, a face of the user who sees the second panel 20 may be reflected on the first region 31. Since the mirror function allows the user to check his/her own look any time, the mirror function may be very useful for, for example, a lady who holds the camera 100. When the second panel 20 is at the first position illustrated in FIG. 3 and the user opens the second panel 20 and adjusts the second panel 20 to be in the state illustrated in FIG. 6, the user may check his/her own look using a mirror formed in the first region 31 of the second panel 20 without any additional manipulation.

While the mirror function is performed, an image may be displayed on a second region 32 of the electronic mirror display unit 30. By applying an electrical signal only to pixels included in the second region 32, the image may be displayed only on the second region 32. A menu 32*b* for changing an operation of the camera 100, for example, may be displayed on the second region 32. When the user selects "image capturing function" from the menu 32*b* displayed on the second region 32, a display function of displaying an image on the first region 31 by applying an electrical signal to pixels included in the first region 31 may be performed.

When the angle β between the first panel 10 and the second panel 20 is adjusted in the range of an obtuse angle, it may be set in advance using the menu of the camera 100 to convert at least part of the electronic mirror display unit 30 into the mirror.

As described above, the operation example in which the image is displayed on the second region 32 of the electronic mirror display unit 30 while the mirror function is performed has been described. However, the present embodiment is not limited to the operation example. Thus, while the mirror function is performed, the whole region including the first region 31 and the second region 32 of the electronic mirror display unit 30 may also be changed into the mirror.

Figure 7:
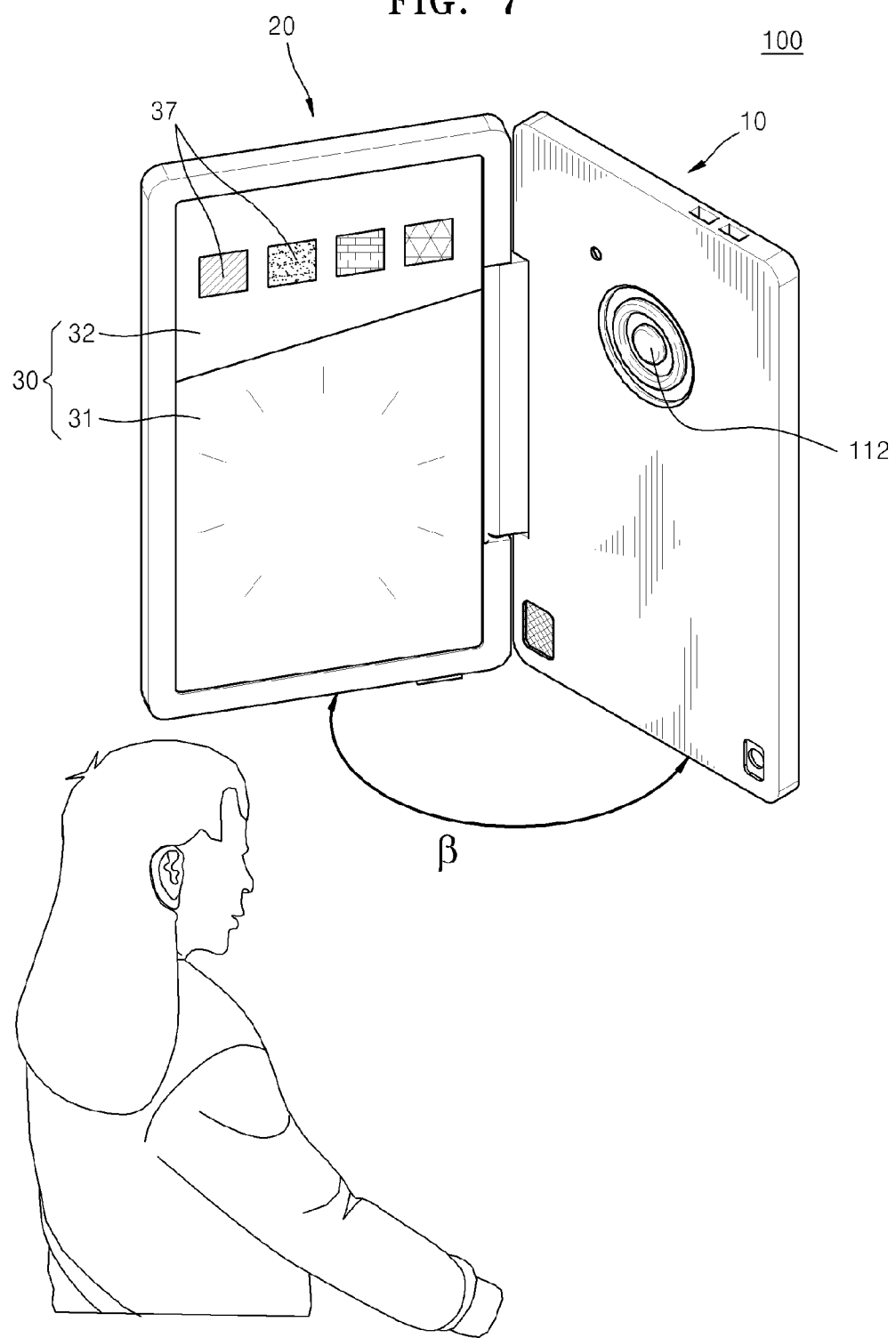
FIG. 7 is an isometric view of another operating state of the camera illustrated in FIG. 1.

FIG. 7 is an isometric view of another operating state of the camera 100 illustrated in FIG. 1.

FIG. 7 illustrates an operating state where an image capturing function is performed using the lens units 112 when the angle β between the first panel 10 and the second panel 20 is in the range of an obtuse angle. When the image capturing function is performed, an illumination function of emitting illumination light for illumination may also be performed using the first region 31 of the electronic mirror display unit 30.

The illumination function may be performed by applying an electrical signal to pixels included in the first region 31 of the electronic mirror display unit 30 so that the pixels emit white light. While the illumination function is performed, guide marks 37 that indicate colors of the illumination light may be displayed on the second region 32 of the electronic mirror display unit 30.

When the angle β between the first panel 10 and the second panel 20 is adjusted in the range of the obtuse angle and the camera 100 is rotated so that a side of the camera 100 faces down, as illustrated in FIG. 7, for example, the gyro sensor 14 of FIG. 1 recognizes a change of the position of the camera 100 so that it may be set in advance using the menu of the camera 100 to allow at least part of the electronic mirror display unit 30 to perform the illumination function.

In FIG. 7, the guide marks 37 are illustrated as rectangles indicating colors of light for illumination that may be selected according to the illumination state of the subject. The guide marks 37 displayed on the second region 32 may include white light, color corresponding to an incandescent lamp, color corresponding to solar light, or the like. In addition, the guide marks 37 disposed on the second region 32 may include a menu (not shown) that may adjust brightness of light for illumination.

Since the user may select a desired color of the illumination light from the guide marks 37 displayed on the second region 32, white balance of an image captured by the camera 100 may be adjusted in various ways.

Figure 8:
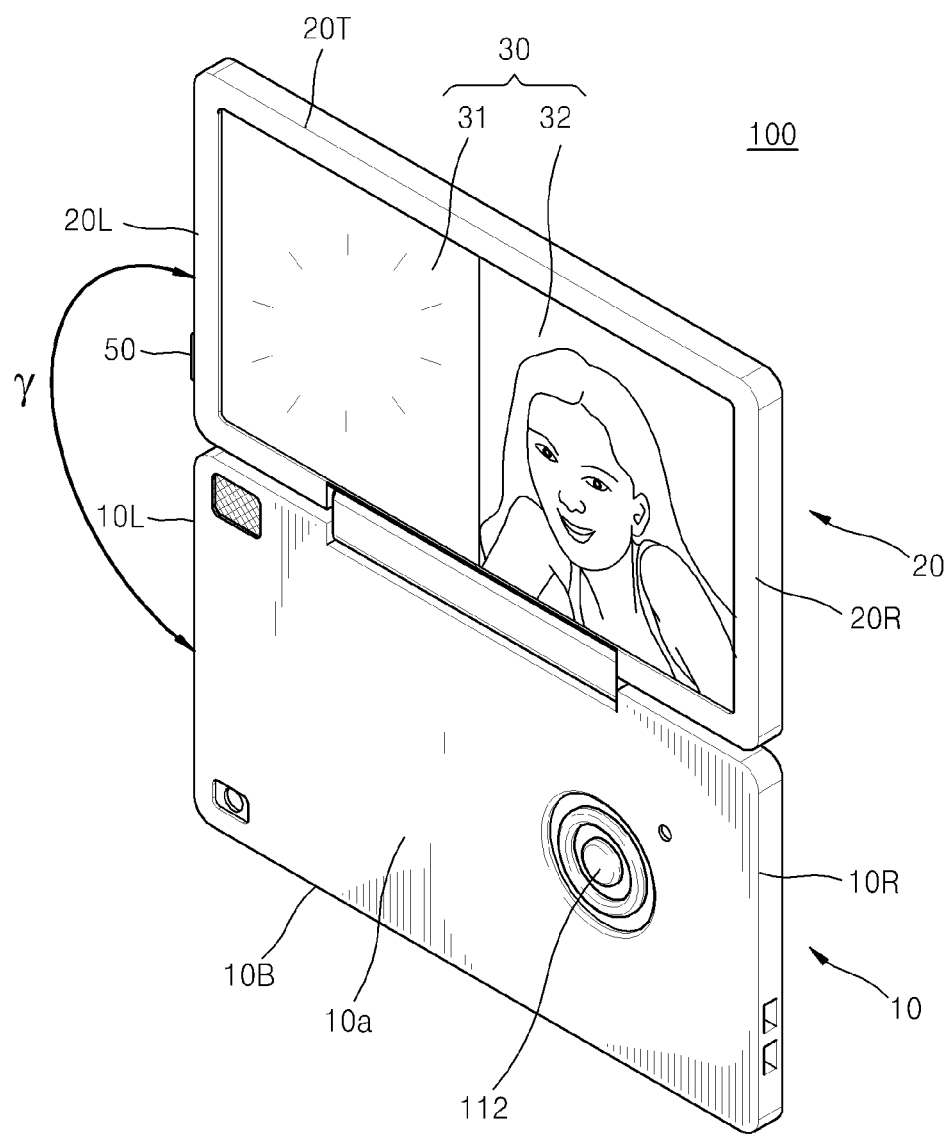
FIG. 8 is an isometric view of another operating state of the camera illustrated in FIG. 1.

FIG. 8 is an isometric view of another operating state of the camera 100 illustrated in FIG. 1.

When an angle γ between the first panel 10 and the second panel 20 is about 180 degrees, as illustrated in FIG. 8, the image of the subject incident through the lens units 112 may be disposed on the second region 32 of the electronic mirror display unit 32. In this way, a function in which the user of the camera 100 may perform image capturing by checking his/her own look is referred to as a self-image capturing function. While the self-image capturing function is performed, the illumination function of emitting illumination light may be performed using the first region 31 of the electronic mirror display unit 30.

Since the present embodiment is not limited to the operation example described above, the image of the subject may be displayed on the first region 31 of the electronic mirror display unit 30, and light for illumination may be emitted onto the second region 32. Alternatively, the image of the subject may be displayed using both the first region 31 and the second region 32, and the illumination function may not be performed.

Even when the self-image capturing function and the illumination function are performed simultaneously, a color or intensity of the illumination light may be adjusted. For example, the user may change a color of light whenever the user touches the surface of the electronic mirror display unit 30, and a menu (not shown) that changes the color or intensity of light may be displayed on a part of the first region 31.

In order to perform the self-image capturing function, the user may manipulate the shutter button 50 disposed at a left edge 20L of the second panel 20. The position of the shutter button 50 is not limited to the example of FIG. 8. For example, the shutter button 50 may be disposed at a right edge 20R or a top edge 20T of the second panel 20, or at at least one of three edges 10L, 10R, and 10B of the first panel 10, or the side 10a of the first panel 10.

Figure 9:
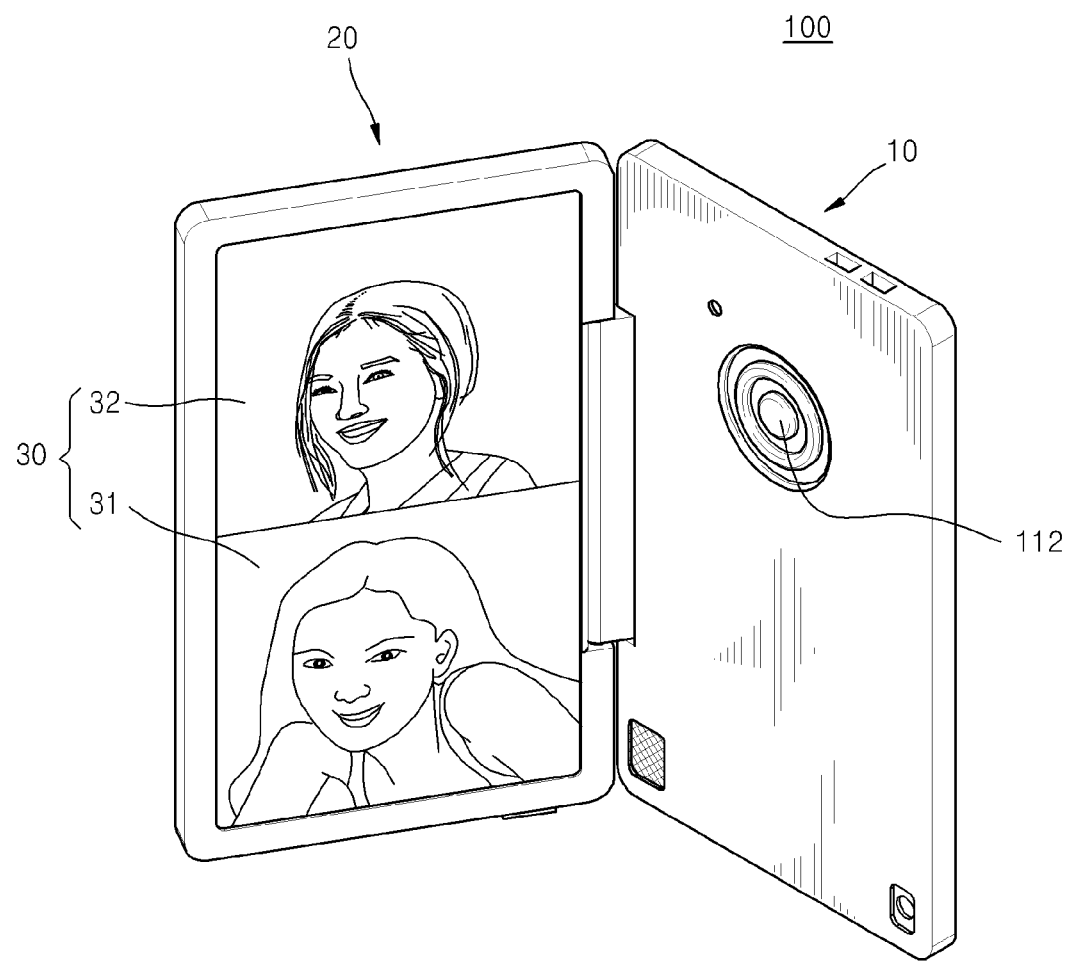
FIG. 9 is an isometric view of another operating state of the camera illustrated in FIG. 1.

FIG. 9 is an isometric view of another operating state of the camera 100 illustrated in FIG. 1.

FIG. 9 illustrates an operating state where a video communication function is performed using the camera 100. Since the camera 100 includes the communication unit 180 illustrated in FIG. 2, the user may have a video call with another person using the camera 100.

When the video call is connected to other person, the look of the user of the camera 100 user may be displayed on the first region 31 of the electronic mirror display unit 30, and the look of the other person may be displayed on the second region 32 of the electronic mirror display unit 30.

A user's image is captured through the lens units 112 disposed on the first panel 10 so that the user's look may be displayed on the first region 31. In addition, image information regarding the call opponent transmitted through the communication unit 180 may be displayed on the second region 32.

Figure 10:
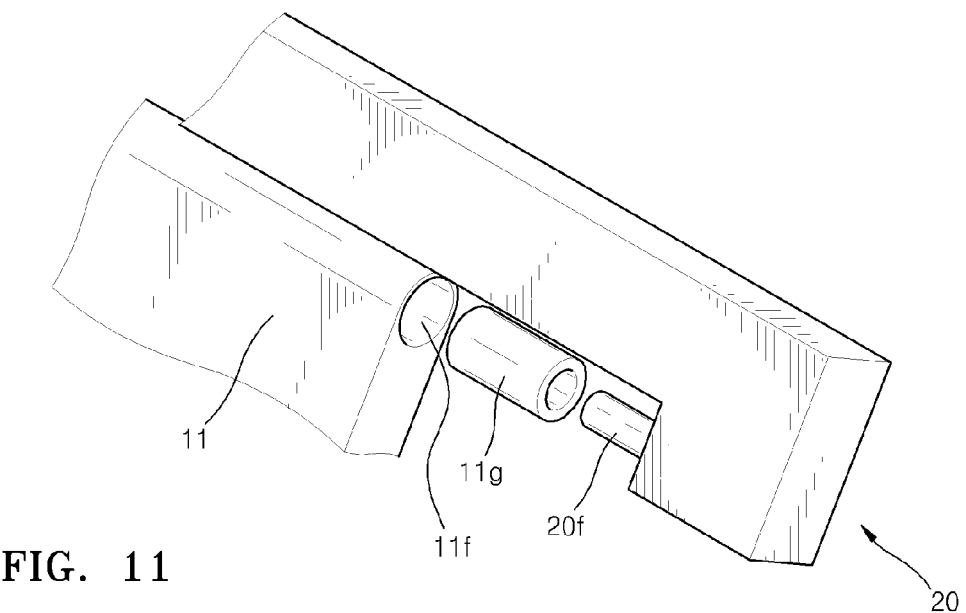
FIG. 10 is an exploded isometric view schematically illustrating the connection relationships between some elements of the camera illustrated in FIG. 1.

FIG. 10 is an exploded isometric view schematically illustrating the connection relationships between some elements of the camera 100 illustrated in FIG. 1.

In the camera 100 illustrated in FIGS. 1 through 9, when the angle between the first panel 10 and the second panel 20 is adjusted, the first panel 10 and the second panel 20 may be maintained at the adjusted angle. The hinge portion 11 may include an angle maintaining function of maintaining the first panel 10 and the second panel 20 at the adjusted angle.

Referring to FIG. 10, the hinge portion 11 includes a support hole 11f into which a rotation shaft 20f of the second panel 20 is inserted. A friction portion 11g that exerts a frictional force between the rotation shaft 20f and the support hole 11f is disposed outside the rotation shaft 20f. Due to exertion of the friction portion 11g, the angle between the first panel 10 and the second panel 20 may be maintained in the adjusted state.

Figure 11:
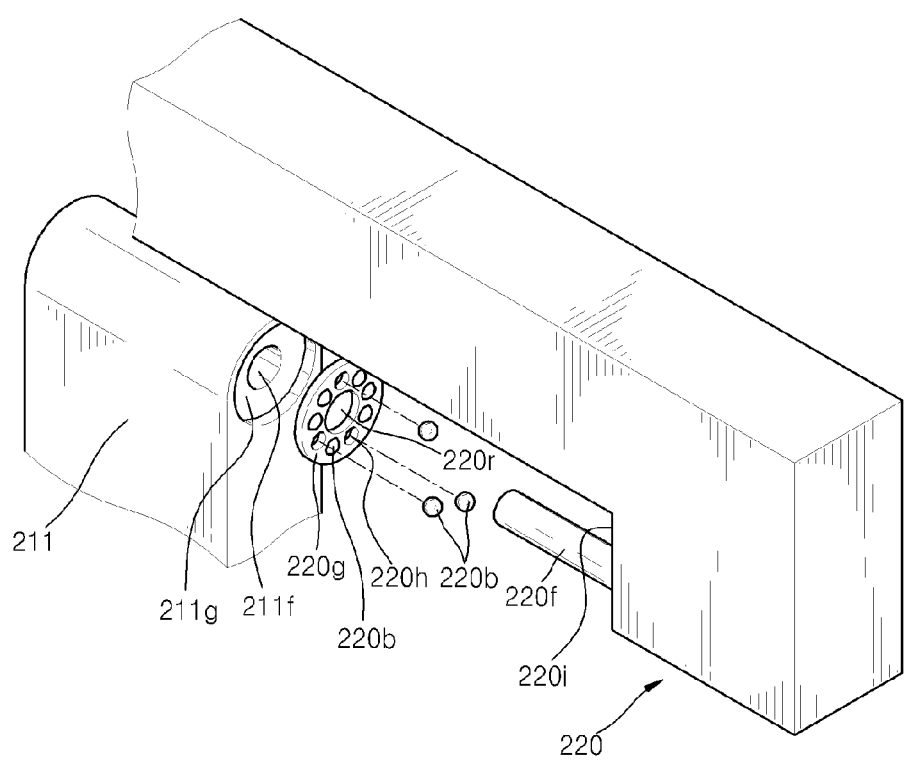
FIG. 11 is an exploded isometric view schematically illustrating the connection relationships between some elements of a camera, according to another embodiment of the invention.

FIG. 11 is an exploded isometric view schematically illustrating the connection relationships between some elements of a camera according to another embodiment of the invention.

Referring to FIG. 11, the angle maintaining function of the hinge portion 211 may be implemented by an angle adjusting plate 220g and balls 220b, which are disposed between the hinge portion 211 and the rotation shaft 220f of a second panel 20. The angle adjusting plate 220g is disposed in a recess 211g formed outside the support hole 211f of the hinge portion 211 through which the rotation shaft 220f is inserted. The angle adjusting plate 220g includes a plurality of grooves 220h that are spaced apart from each other in a circumferential direction of the angle adjusting plate 220g, and the balls 220b are rotatably combined with the plurality of grooves 220h.

A support groove (not shown) that supports the balls 220b may also be formed in a contact surface 220i facing the hinge portion 211 of the second panel 220. Thus, when the second panel 220 is combined with the hinge portion 211, the rotation shaft 220f of the second panel 220 is inserted in the support hole 211f through a through hole 220r of the angle adjusting plate 220g.

When the second panel 220 is rotated relative to the hinge portion 211 and an angle between the second panel 220 and the hinge portion 211 is adjusted, the balls 220b are maintained in the state combined with the grooves 220h so that the angle between the second panel 220 and the hinge portion 211 may be maintained by the adjusted angle.

Figure 12:
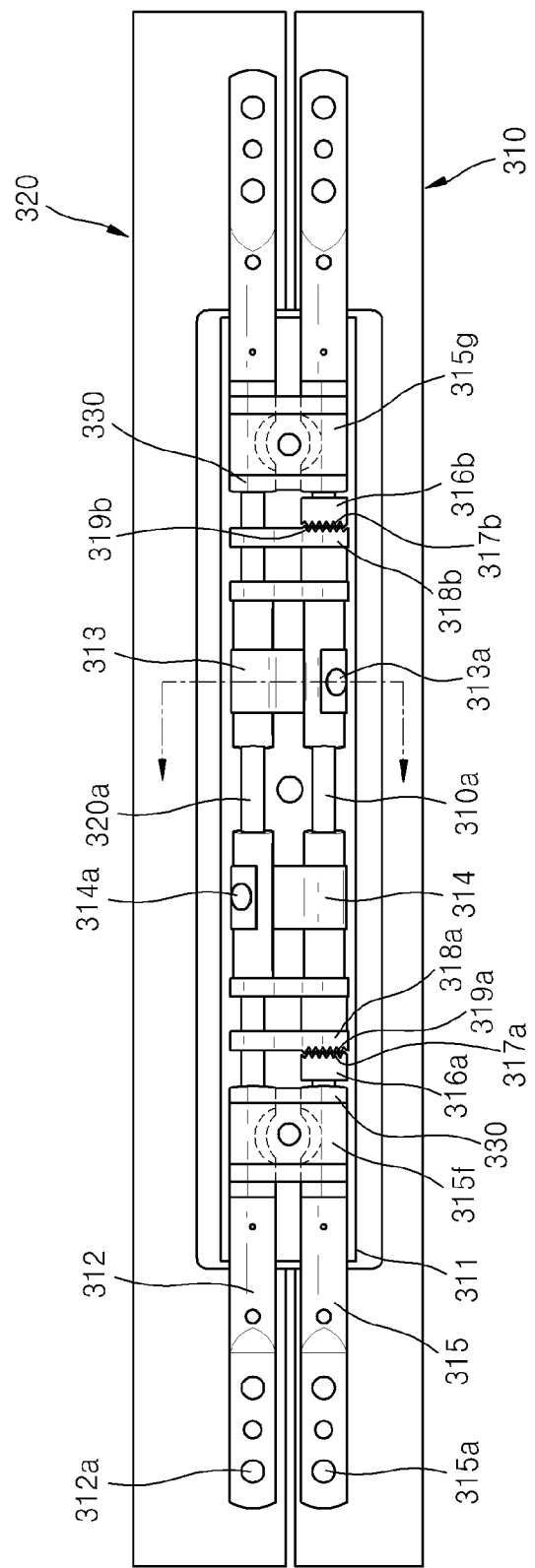
FIG. 12 is a front view schematically illustrating the connection relationships between some elements of a camera, according to another embodiment of the invention.
Figure 13:
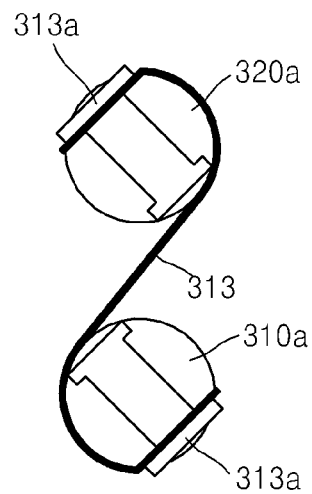
FIG. 13 is a cross-sectional view of part of the camera illustrated in FIG. 12.

FIG. 12 is a front view schematically illustrating the connection relationships between some elements of a camera according to another embodiment of the invention, and FIG. 13 is a cross-sectional view of part of the camera illustrated in FIG. 12.

The camera illustrated in FIGS. 12 and 13 has a modified structure of a hinge portion 311 connecting a first panel 310 and a second panel 320 rotatably in the range of 360 degrees.

The hinge portion 311 includes a first fixing shaft 315 fixed to the first panel 310 via a rivet 315a, a second fixing shaft 312 fixed to the second panel 320 via a rivet 312a, a first rotation shaft 310a that is rotatably combined with the first fixing shaft 315, and a second rotation shaft 320a that is rotatably combined with the second fixing shaft 312.

The first rotation shaft 310a and the second rotation shaft 320a are connected to each other by a first belt 313 and a second belt 314. Both sides of each of the first belt 313 and the second belt 314 are fixed on the first rotation shaft 310a and the second rotation shaft 320a via rivets 313a and 314a.

Rotors 316a and 316b are disposed outside the first rotation shaft 310a and are rotated together with the first rotation shaft 310a. Sensor brackets 315f and 315g are disposed on the first fixing shaft 315 and the second fixing shaft 312, respectively, and rotation detecting units 330 are installed at ends facing the rotors 316a and 316b of the sensor brackets 315f and 315g, respectively. The rotation detecting units 330 may be implemented using optical sensors, contact sensors, magnetic detecting sensors, or the like, and may detect rotation angles of the rotors 316a and 316b.

The rotors 316a and 316b include gear facets 317a and 317b, which are formed on ends of the rotors 316a and 316b, respectively. Support portions 318a and 318b are combined with outsides of the first rotation shaft 310a and the second rotation shaft 320a and support the first rotation shaft 310a and the second rotation shaft 320a rotatably, respectively. The support portions 318a and 318b include gear facets 319a and 319b, which correspond to the gear facets 317a and 317b of the rotors 316a and 316b. Thus, after a rotation angle between the first panel 310 and the second panel 320 is adjusted, the gear facets 317a, 317b, 319a, and 319b of the support portions 318a and 318b and the rotors 316a and 316b engage with one another so that the rotation angle between the first panel 310 and the second panel 320 may be maintained in the adjusted state.

Since the present embodiment is not limited to the configuration of the hinge portion 311 or the rotation detecting units 330 described above, a variety of modifications may be possible. For example, a function of adjusting the rotation angle between the first panel 310 and the second panel 320 may be automatically implemented using a driving force of a motor installed at the hinge portion 311, for example, and the rotation angle between the first panel 310 and the second panel 320 may also be detected using an element such as an encoder for detecting a rotation of a shaft of the motor.

FIGS. 14A through 14E illustrate operation examples of a change in rotation angles of a first panel and a second panel of the camera illustrated in FIG. 12.

Figure 14A:
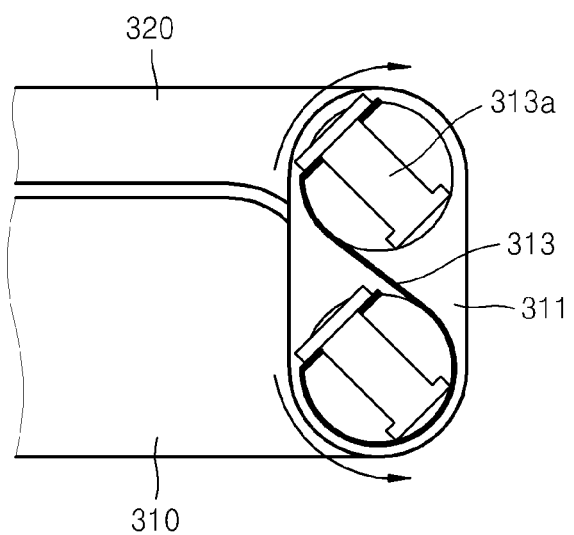
FIGS. 14A through 14E illustrate operation examples of a change in rotation angles of a first panel and a second panel of the camera illustrated in FIG. 12.
Figure 14B:
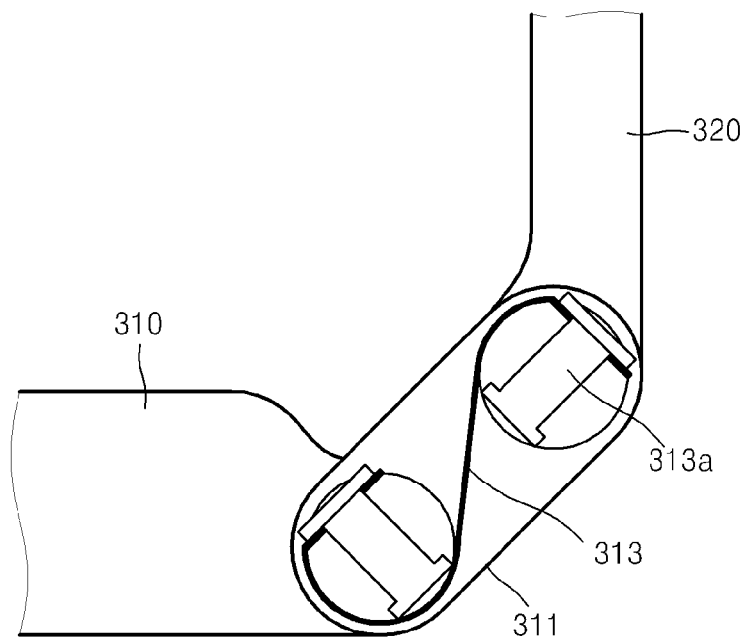
Figure 14C:
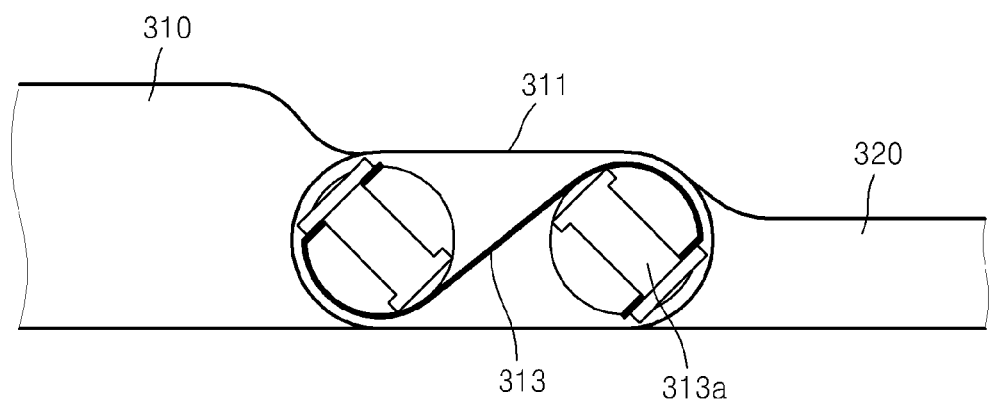
Figure 14D:
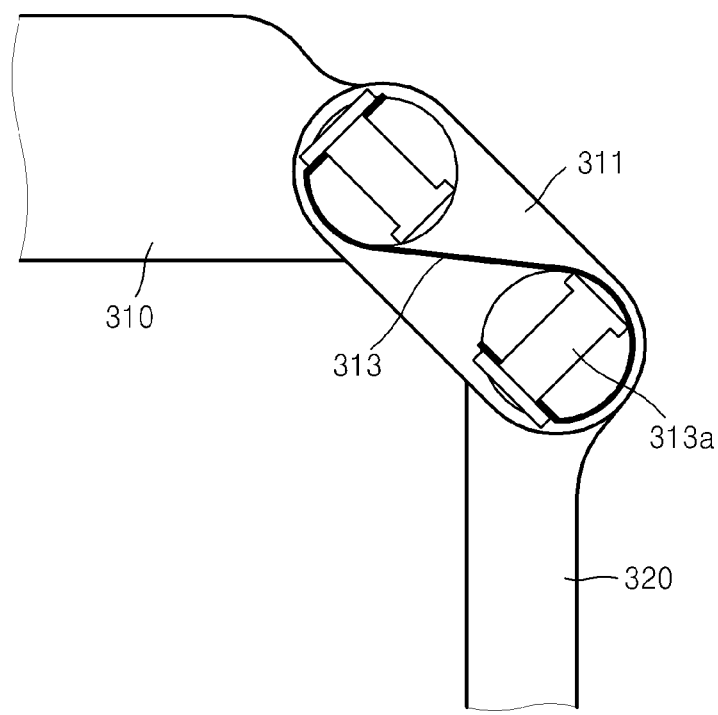
Figure 14E:
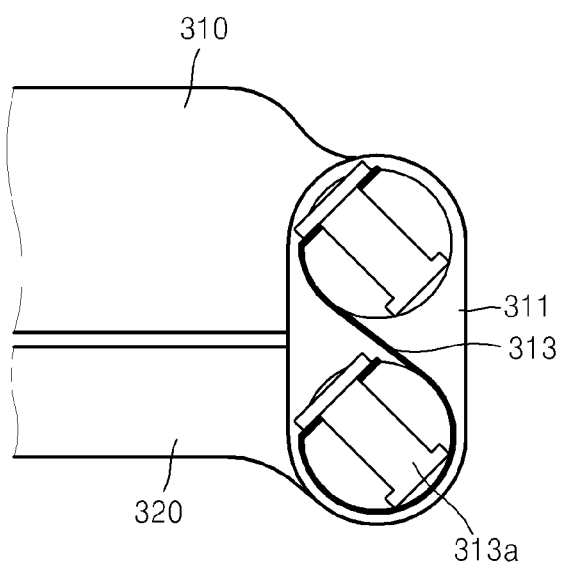

FIG. 14A illustrates an adjusted state where the first panel 310 and the second panel 320 of FIG. 13 form an angle of 0 degree, and FIG. 14B illustrates an adjusted state where the first panel 310 and the second panel 320 form an angle of about 90 degrees, and FIG. 14C illustrates an adjusted state where the first panel 310 and the second panel 320 form an angle of about 180 degrees, and FIG. 14D illustrates an adjusted state where the first panel 310 and the second panel 320 form an angle of about 270 degrees, and FIG. 14E illustrates an adjusted state where the first panel 310 and the second panel 320 form an angle of about 360 degrees.

As apparent from FIGS. 14A through 14E, a rotation angle between the first panel 310 and the second panel 320 may be adjusted in the range between 0 to 360 degrees via the hinge portion 311 illustrated in FIGS. 12 and 13.

Since the rotation angle between the first panel 310 and the second panel 320 may be detected in response to sensor signals of the rotation detecting units 330, the controlling unit 140 of FIG. 2 may perform various functions in correspondence to the rotation angle between the first panel 310 and the second panel 320. The controlling unit 140 may provide a function setting menu so that the user may freely set a function that may be performed in correspondence to the rotation angle between the first panel 310 and the second panel 320.

Figure 15:
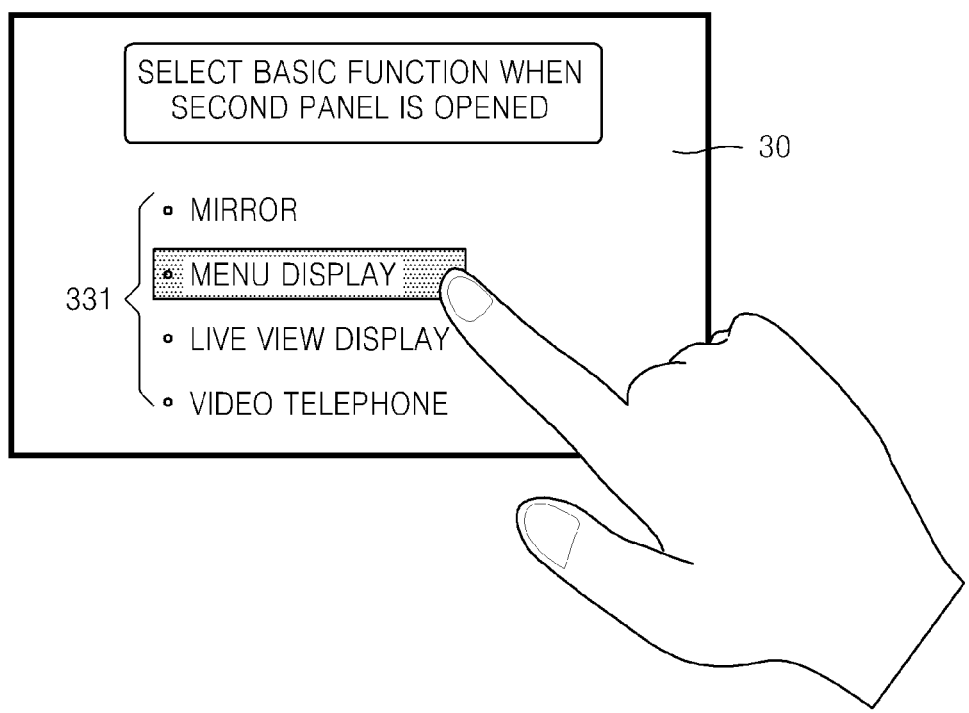
FIG. 15 illustrates an operation example of changing a function according to the rotation angle of the camera illustrated in FIG. 12.

FIG. 15 illustrates an operation example of changing a function according to a rotation angle of the camera illustrated in FIG. 12.

FIG. 15 is an example of the function setting menu that guides the user to freely set a function that may be automatically performed in correspondence to the rotation angle between the first panel 310 and the second panel 320.

FIG. 15 is an example in which, when the angle β between the first panel 10 and the second panel 20 is adjusted in the range of an obtuse angle, as illustrated in FIG. 6, a function that may be automatically performed by the electronic mirror display unit 30 is set. The user may set a function to be automatically performed by selecting one function from a text menu 331 that indicates a plurality of functions, such as "mirror", "menu display of camera", "live view display for image capturing operation", and "video telephone", which may be performed by the electronic mirror display unit 30.

As described above, in a camera with a multi-function display according to the one or more embodiments of the invention, an electronic mirror display unit may perform a mirror function and a display function so that the convenience of using the camera may be increased. In addition, an angle formed by a first panel and a second panel that are rotatably connected to each other may be adjusted in the range of about 360 degrees, and various functions, such as an image capturing function, an illumination function, and a self-image capturing function, and the like, may be performed in association with the adjusted angle formed by the first panel and the second panel. In addition, when the camera is not used, the camera may be conveniently charged using solar light.

The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

While the invention has been particularly shown and described with reference to exemplary embodiments thereof, it will be understood by those of ordinary skill in the art that various changes in form and details may be made therein without departing from the spirit and scope of this disclosure.

What is claimed is:

1. A camera comprising:
   a first panel comprising a plurality of lens units to capture an image, the lens units being disposed on at least one of a first side of the first panel and a second side that is on the opposite side of the first side; and
   a second panel, comprising a front side with an electronic mirror display unit and a back side that is on the opposite side of the front side, wherein the second panel is rotatably connected, having an angular range of about 360 degrees, to one edge of the first panel so that the first panel and the second panel rotate relative to each other between:
      a first position in which the first side of the first panel and the front side of the second panel is contacted; and
      a second position in which the back side of the second panel and the second side of the first panel is contacted,
   wherein the electronic mirror display unit displays an image if a signal is applied to the electronic mirror display unit, and to reflect light if a signal is not applied to the electronic mirror display unit,
   wherein the electronic mirror display unit is to illuminate by emitting illumination light from at least one region of the electronic mirror display unit.

2. The camera of claim 1, further comprising a solar light generation unit to generate electricity by receiving solar light, the solar light generation unit being disposed at the back side of the second panel corresponding to the second side of the first panel at the second position.

3. The camera of claim 1, further comprising a solar light generation unit to generate electricity by receiving solar light, solar light generation unit being disposed at the second side of the first panel.

4. The camera of claim 1, wherein the electronic mirror display unit is to display an image on one region of the electronic mirror display unit and reflects light in another region of the electronic mirror display unit.

5. The camera of claim 1, further comprising an image capturing unit to convert an image formed by each lens unit into an electrical signal, wherein an image captured by the image capturing unit is displayed on at least one region of the electronic mirror display unit.

6. The camera of claim 5, wherein the electronic mirror display unit is to illuminate a subject by emitting illumination light from another region of the electronic mirror display unit.

7. The camera of claim 1, further comprising a communication unit to communicate with an external device, wherein the electronic mirror display unit is to display an image transmitted through the communication unit from the outside device.

8. The camera of claim 7, further comprising a voice input unit to receive a user's voice signal and a speaker to output sound.

9. The camera of claim 1, wherein the electronic mirror display unit is to change a color of the illumination light so as to change a color of a subject being illuminated.

10. The camera of claim 9, wherein the electronic mirror display unit is to display guide marks for changing a color of the illumination light in another region of the electronic mirror display unit.

11. The camera of claim 1, further comprising a touch panel to detect a user's touch, the touch panel being disposed on the electronic mirror display unit.

12. The camera of claim 1, wherein a rotation angle between the first panel and the second panel is maintained after being adjusted in a range from the first position to the second position.

13. The camera of claim 5, further comprising a shutter button to generate a signal due to user's input manipulation so as to start an image capturing operation of the image capturing unit, the shutter button being disposed at a side edge of the first panel.

14. The camera of claim 5, further comprising a shutter button to generate a signal due to user's input manipulation so as to start an image capturing operation of the image capturing unit, the shutter button being disposed at a side edge of the second panel.

15. The camera of claim 5, further comprising a shutter button to generate a signal due to user's input manipulation so as to start an image capturing operation of the image capturing unit, the shutter button being disposed at the first side of the first panel.

16. A camera comprising:
a first panel comprising a plurality of lens units to capture an image, the lens units being disposed on at least one of a first side of the first panel and a second side that is on the opposite side of the first side;
a second panel, comprising a front side with an electronic mirror display unit and a back side that is on the opposite side of the front side, wherein the second panel is rotatably connected, having an angular range of about 360 degrees, to one edge of the first panel so that the first panel and the second panel rotate relative to each other between:
a first position in which the first side of the first panel and the front side of the second panel is contacted; and
a second position in which the back side of the second panel and the second side of the first panel is contacted;
an angle detecting unit to detect a rotation angle between the first panel and the second panel;
a user input unit to receive a user's input, wherein the controlling unit is to change a function to be performed in correspondence to the range of the rotation angle detected by the angle detecting unit based on an input signal of the user input unit; and
a controlling unit that is electrically connected to the angle detecting unit and the electronic mirror display unit and is to control the electronic mirror display unit according to the rotation angle detected by the angle detecting unit to select at least one from among a plurality of functions and to perform the at least one function,
wherein the electronic mirror display unit displays an image if a signal is applied to the electronic mirror display unit and to reflect light if a signal is not applied to the electronic mirror display unit.

17. The camera of claim 16, wherein the electronic mirror display unit is to display a menu for setting a function to be performed in correspondence to the range of the rotation angle detected by the angle detecting unit.

18. The camera of claim 16, further comprising a gyro sensor to detect change of angular orientation of the camera, wherein the controlling unit is to control the electronic mirror display unit according to the change of angular orientation of the camera detected by the gyro sensor to select at least one from among a plurality of functions and to perform the at least one selected function.

19. A camera comprising:
a first panel comprising a plurality of lens units to capture an image, the lens units being disposed on one side of the first panel;
a second panel that is rotatably connected to one edge of the first panel so that the first panel and the second panel rotate relative to each other between a first position contacting the one side of the first panel and a second position contacting the other side of the second panel; and
an electronic mirror display unit disposed at one side of the second panel corresponding to the one side of the first panel at the first position, wherein the electronic mirror display unit is configured to:
display an image if a signal is applied to the electronic mirror display unit, and to reflect light if a signal is not applied to the electronic mirror display unit;
illuminate a subject by emitting illumination light from at least one region of the electronic mirror display unit;
change a color of the illumination light so as to change a color of the subject; and
display guide marks for changing a color of the illumination light in another region of the electronic mirror display unit.

20. A camera comprising:
a first panel comprising a plurality of lens units to capture an image, the lens units being disposed on one side of the first panel;
a second panel that is rotatably connected to one edge of the first panel so that the first panel and the second panel rotate relative to each other between a first position contacting the one side of the first panel and a second position contacting the other side of the second panel;
an angle detecting unit to detect a rotation angle between the first panel and the second panel;
an electronic mirror display unit to display an image if a signal is applied to the electronic mirror display unit and to reflect light if a signal is not applied to the electronic mirror display unit, the electronic mirror unit being disposed at one side of the second panel corresponding to the one side of the first panel at the first position;
a controlling unit that is electrically connected to the angle detecting unit and the electronic mirror display unit and is to control the electronic mirror display unit according to the rotation angle detected by the angle detecting unit to select at least one from among a plurality of functions and to perform the at least one function; and
a user input unit to receive a user's input, wherein the controlling unit is to change a function to be performed in correspondence to the range of the rotation angle detected by the angle detecting unit based on an input signal of the user input unit.

21. The camera of claim 20, wherein the electronic mirror display unit is to display a menu for setting a function to be performed in correspondence to the range of the rotation angle detected by the angle detecting unit.

* * * * *